United States Patent [19]

Bussey et al.

[11] 4,453,403

[45] Jun. 12, 1984

[54] VOLUMETRIC METERING EQUIPMENT

[75] Inventors: Stephen Bussey, Buckingham; Barry Cockburn, Gawcott; Alastair E. F. Heath, Dunton, all of England

[73] Assignee: Leslie Hartridge, Ltd., Buckingham, England

[21] Appl. No.: 414,500

[22] Filed: Aug. 31, 1982

[30] Foreign Application Priority Data

Sep. 3, 1981 [GB] United Kingdom ............... 8126757

[51] Int. Cl.³ .................................................. G01F 3/14
[52] U.S. Cl. ................................................... 73/119 A
[58] Field of Search .................... 73/119 A, 113, 168, 73/239, 232, 168; 310/338; 328/132

[56] References Cited

U.S. PATENT DOCUMENTS

| | | | |
|---|---|---|---|
| 4,008,405 | 2/1977 | Neumann et al. | 328/132 |
| 4,171,638 | 10/1979 | Coman et al. | 73/168 |
| 4,227,402 | 10/1980 | Dooley et al. | 310/338 |
| 4,362,052 | 12/1982 | Heath et al. | 73/119 A |
| 4,391,133 | 7/1983 | Ito | 73/119 A |

OTHER PUBLICATIONS

Thoma, Frank, *The Fuel Delivery Indicator (FDI), a Useful Device for the Development of Diesel Engines,* ASME Publication, N.Y., 1975, pp. 1 to 7, No. 74-DG-P-5.

*Primary Examiner*—Gerald Goldberg
*Assistant Examiner*—Ellwood G. Harding, Jr.
*Attorney, Agent, or Firm*—Berman, Aisenberg & Platt

[57] ABSTRACT

Volumetric metering equipment comprising an injector mounting block by which injectors of a multi-line fuel injection system can be mounted on the equipment. A measuring device is in communication with the mounting block via a feed line to allow test fluid to pass from the injectors to the measuring device when the equipment is in use. The measuring device is constructed to provide signals which are indicative of the amount of test fluid received by the device. Point-of-injection detectors are arranged adjacent to the injectors for determining which of the signals relate to an individual injection.

15 Claims, 11 Drawing Figures

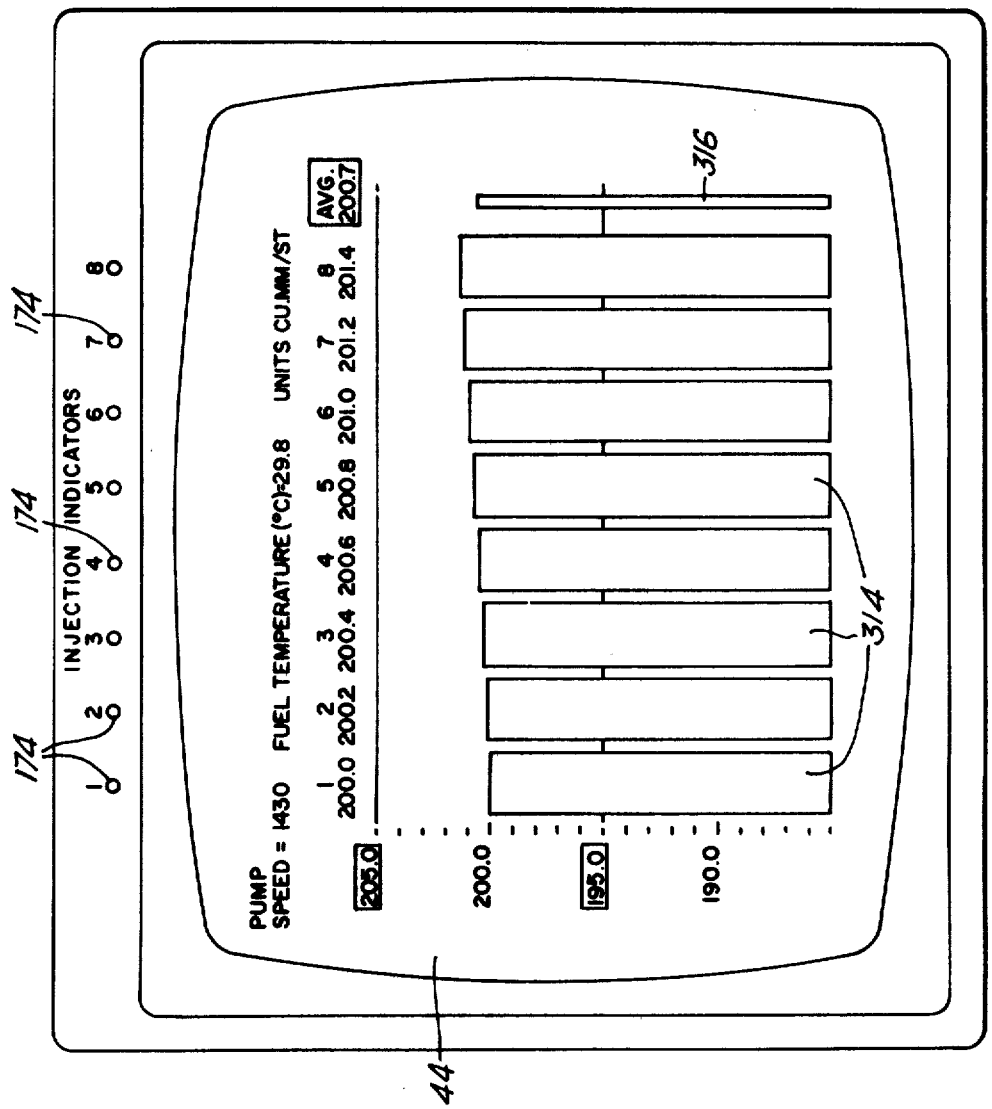

VOLUMETRIC METERING EQUIPMENT

This invention relates to volumetric metering equipment, for example to equipment which measures the volume of test fluid pumped through the individual injectors of a multi-line fuel injection system for an internal combustion engine when the system is on test.

One shortcoming of previous metering units is that they cannot provide information on any individual injection of an individual injector. Furthermore, the total volume of a large number of injections has to be measured to give the required accuracy.

The present invention is directed to volumetric metering equipment comprising connection or mounting means by which an injector of a fuel injection system can be connected to or mounted on the equipment, a measuring device which is in communication with the connection or mounting means via at least one passageway to allow test fluid to pass from such an injector to the measuring device when the equipment is in use, the measuring device being constructed to receive test fluid continuously from a succession of individual injections and to provide a signal or signals which are indicative of the amount of test fluid received by the device, and means arranged in relation to a part of the equipment, or a part of such a system when the equipment is in use, for determining which of the signals, or values of the signal, relate to each of a succession of individual injections.

The measuring device may be made with a chamber of variable volume which is gradually increased during successive injections from an injector when the equipment is in use, the said signals being indicative of the increase in volume of the chamber. For example, the measuring device may comprise a positive displacement piston and cylinder arrangement. Furthermore, it may include a displacement/electrical transducer.

The equipment may further comprise detection means for detecting a point in an injection cycle when transients in the measuring device have decayed, the equipment being constructed to monitor the signals from the measuring device between successive such points. The detection point may for example be the commencement point of the next injection.

In one possible construction of the detection means, there is a cavity for receiving the nozzle end of an injector, and a pressure sensor in or in communication with the cavity, arranged to detect when test fluid is shot out through the nozzle of the injector. The pressure sensor may be a piezoelectric transducer. It has been found that such a transducer will work particularly effectively if its piezoelectric crystal is retained loosely.

In previously proposed metering units the volume of test fluid delivered by each injector or group of injectors has been measured over a predetermined number of injections. This process is repeated for each line or group of lines of the system in turn, with the result that the complete metering procedure for the injection system can be a relatively long process, unless respective measuring devices are provided for all the injectors, in which case the metering equipment becomes very expensive. Metering equipment can be made in accordance with the present invention in which the time of the overall metering procedure is reduced without unduly increasing the cost of the metering equipment. To this end, the metering equipment may be provided with means for so connecting the measuring device that it is open, at the same time, to receive test fluid from more than one injector or group of injectors of a multi-line fuel injection system which is on test. In this case the detection means may comprise a plurality of detectors arranged to detect which injector or group of injectors is responsible for each successive injection. There may then be recording means connected to receive signals from the measuring device and the detector means to provide a record of the respective volumes of test fluid, ejected over a given period of operation or over a given number of injections, from the individual injectors or groups of injectors, the metering procedure for more than one injector or group of injectors thus being performed over the same period of operation or over the same number of injections from each injector.

Thus, one or more of the following features may be present in various examples of metering equipment embodying the present invention:

(a) means for detecting a point in the injection cycle when transients in the metering device have decayed following an individual injection, for example, the actual commencement point of the next injection;

(b) means for identifying the injector which is responsible for any given injection into the metering equipment;

(c) the opening of more than one injector line to a measuring device of the unit at the same time, to allow fuel from more than one injector to be metered as the injections occur;

(d) a computer programmed to allocate values supplied to it by the measuring device in relation to the various injectors to respective stores or groups of stores of the computer, whereby the computer can provide information in relation to each individual injector even when it is supplied with a succession of values relating to a sequence of injections from one or more injectors;

(e) the use of a temperature sensitive device to measure the temperature of the test fluid in the measuring device and enable corrections to be made to the volume readings, to account for volumetric expansion and contraction of the test fluid which occurs as a result of changes in temperature; and (f) a measuring device of sufficient accuracy to measure the volumes of individual injections.

The measuring device may comprise one or more of the following features to give it sufficient accuracy:

(i) a positive displacement piston and cylinder arrangement to define a metering chamber;

(ii) a piston of reduced cross-sectional area, for example in the range from 50 to 500 mm$^2$, or perhaps 50 to 1000 mm$^2$;

(iii) the use of a displacement measuring means which is of high resolution.

In one of its forms, the invention is directed to a volumetric metering unit for metering test fluid ejected from a multi-line fuel injection system which is on test, comprising a measuring device for connection directly or indirectly to such an injection system to receive test fluid ejected from any selected one or more of the injectors of the system, a detector arranged to detect instants which occur during quiescent periods between injections, from the selected injector or injectors, and indicator means connected to the measuring device to provide an indication of the volume of test fluid received thereby between two successive such instants detected by the detector.

The measuring device may comprise a positive displacement piston and cylinder arrangement, the piston and cylinder defining a metering chamber which is increased in volume by linear displacement of the piston. A quiescent period associated with this arrangement following an injection occurs when the piston in the cylinder has stopped moving.

Whatever particular measuring device is used, one possible instant which may be detected, and which will occur during a quiescent period, is the commencement point of the next injection. This point occurs immediately prior to reception of further fluid by the measuring device, because of the finite time, although very small, which a shock wave in the test fluid generated at the commencement of injection takes to travel from the detection means concerned to the measuring device.

One detector for detecting a point of injection comprises a piezoelectric transducer.

Other detectors may be used to identify the instants between which a measurement is made. For example, pressure transducers comprising strain gauges or needle lift transducers, or arrangements comprising ports and leaf-springs with associated magnets and magnetic pick-up heads, may be suitably arranged to provide indications of each commencement of injection, which normally occurs when the pressure of the test fluid in the measuring device has settled down to a steady value following the immediately preceding injection.

Metering of fluid from each of a plurality of injectors can be performed over the same period of operation if the metering unit is provided with respective detectors, one for each injector. The processing of the information obtained from such a metering unit can be performed with sufficient speed and accuracy by means of a computer connected to receive output signals from the measuring device and each detector. The volumetric measurement of each injection performed by the measuring device is fed into a store in the computer associated with the particular injector responsible for that injection. The current store is identified according to which detector feeds an input signal to the computer at that time.

If the detectors are point-of-injection detectors, the measured volume of the fluid which passes into the measuring device between successive signals from two of the detectors gives the size of the injection from the injector associated with the detector which gave the *first* of those signals. In other words, the measured value received by the computer or stored in the computer when a detector signal is received relates to the injector associated with the detector which gave the immediately preceding signal.

It is preferable to provide circuitry with the or each detector, for example, a monostable multivibrator, which switches to an "on" state for a predetermined short interval following the instant of detection. This ensures that the circuitry is not switched erroneously by echo, bounce or extensive noise generated mechanically or electrically following the instant of detection.

It is possible, if the rotary speed of the injection system pump exceeds a predetermined value, that the interval between successive injections will be less than the time taken for a transient or transients associated with the measuring device to decay. To avoid erroneous measurements that would occur as a result, valve means may be connected between the injector system and measuring device to allow, for example, only lines from alternate injectors, say, all the even numbered injectors, to be open to the measuring device for a first measuring procedure, and then the lines from the other injectors, say all the odd numbered injectors, in a second measuring procedure. The injectors are numbered in this sense in line delivery order. The interval between successive used detection signals will then be twice as long, ensuring that, when each used detection signal is issued, the transient or transients associated with the measuring device have decayed.

An example of a volumetric metering unit in accordance with the present invention is illustrated in the accompanying diagrammatic drawings, in which:

FIG. 11 shows the format of a video display produced on a cathode ray tube of the unit.

Figure 1:
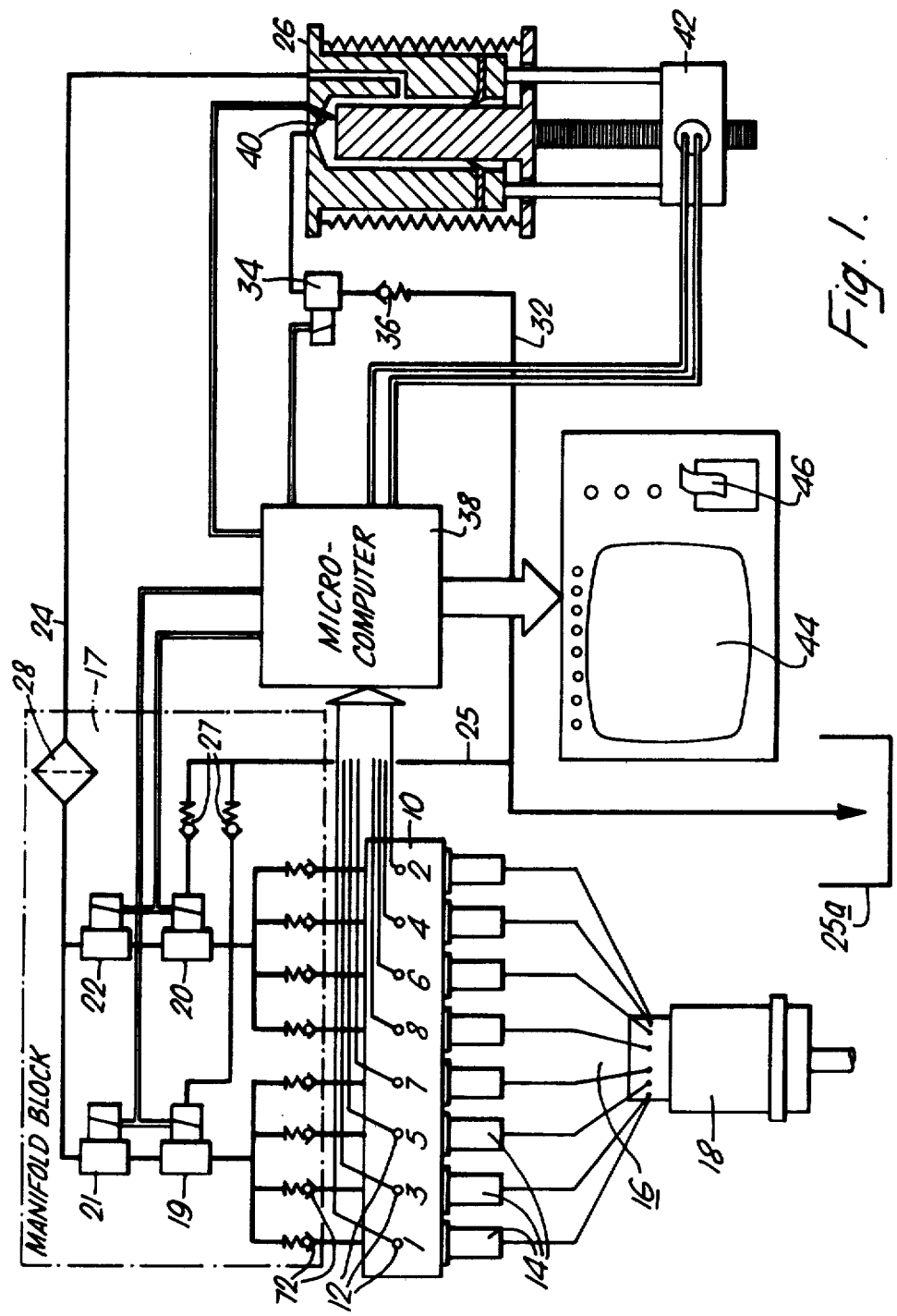
FIG. 1 is a schematic diagram of the unit.

The basic arrangement of the volumetric metering unit will first be described with reference to FIG. 1. It comprises an injector connector or mounting block 10 which has eight point-of-injection detectors 12 connected respectively to eight injectors 14 of an eight-line fuel injection system 16 which also includes a fuel injection pump 18. It will be appreciated that the unit could easily be modified for testing a twelve-line system, or a one-line system or any multi-line system.

A manifold block 17 having eight inlet connections 72, is provided with two diverter valves 19 and 20, and two isolating valves 21 and 22 connected to selectively allow fluid to flow from the lines connected to the even and odd numbered injectors respectively into a feed line 24. When the valves 19 and 21 are energised, fluid from the odd-numbered lines flows into the feed line 24. When the valves 20 and 22 are not energised, fluid from the even-numbered lines is directed into a drain line 25 via a pressurising valve 27.

When the valves 20 and 22 are energised and the valves 19 and and 21 are not energised, the situation is reversed.

The drain line 25 leads to a reservoir 25a of test fluid.

The feed line 24 connects the isolating valves 21 and 22 to a measuring device 26 in the form of a piston and cylinder arrangement, via a filter 28 which prevents any solid particles entering the metering cylinder.

A drain line 32 connects the measuring device 26 to the test fluid reservoir 25a via a control valve 34 and a back pressurising valve 36. The back pressurising valve 36 maintains sufficient back pressure on the system to prevent gas bubbles or vapour forming in the test fluid.

The control valve 34 is selectively operable to start metering of the fluid by the measuring device 26.

A microcomputer 38 of the metering equipment is connected to receive electrical signals from the point-of-injection detectors 12, a thermister 40 positioned in the measuring device 26 to provide an indication of the temperature of test fluid therein, and an optical reading head 42 of the measuring device 26. The microcomputer is programmed to process the signals it receives from those various parts of the metering equipment to display useful information relating to the operation of the injector system on test on a cathode ray tube 44 and also on a print-out 46, although it will be appreciated that the computer may be programmed to control many different forms of display.

The structures of the various parts of the metering equipment will now be described in greater detail.

Figure 2:
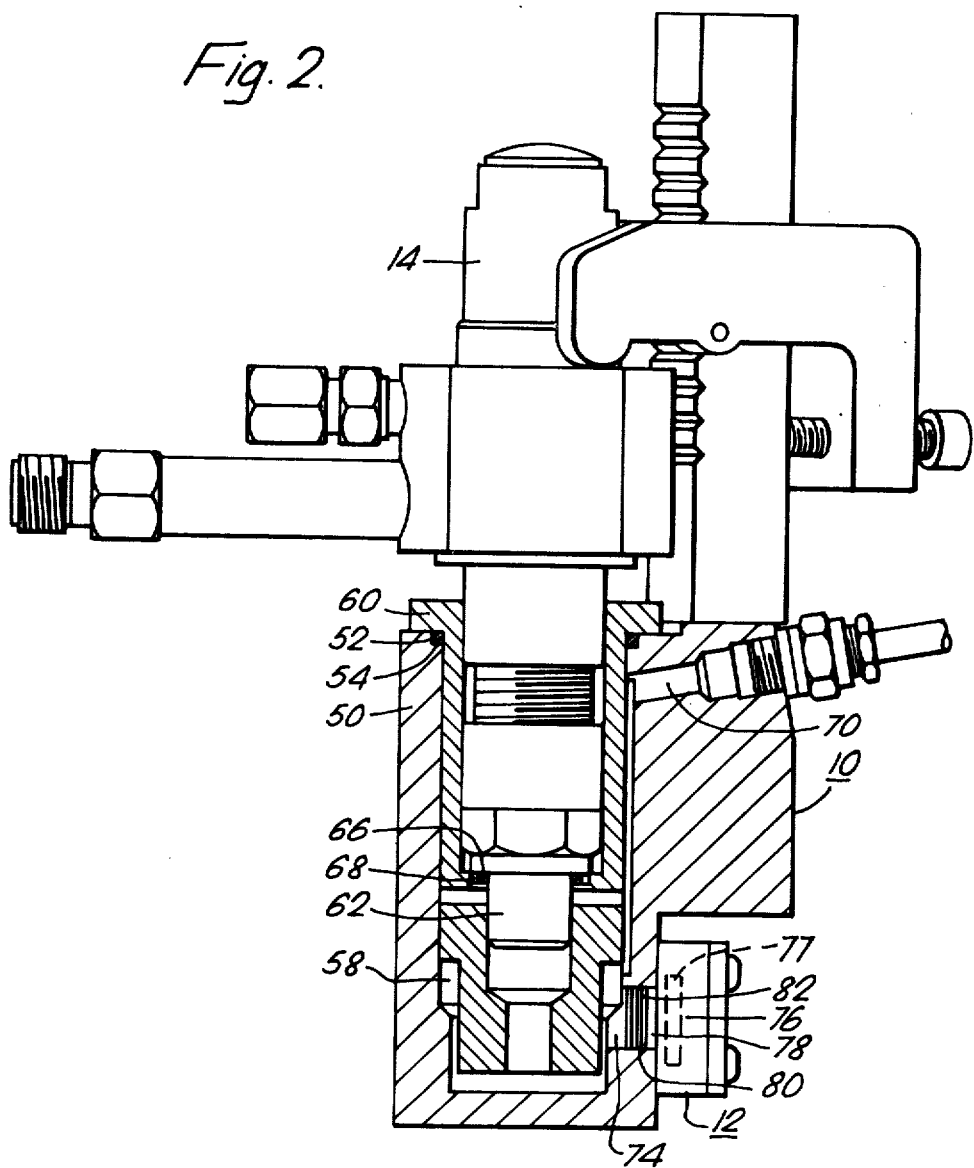
FIG. 2 is a longitudinal sectional view of an injector mounting block containing point-of-injection detectors.

The injector mounting block 10 is shown in detail in FIG. 2. It comprises an injector mounting sub-block 50, which has eight mounting cavities 58 bored into it (only one of which is shown in FIG. 2).

Mounting inserts 60 are inserted into the cavities 58 each insert receiving the cylindrically formed end 62 of an injector 14. When the metering unit is in use a sealing connection between the injector 14 and the mounting sub-block 50 is effected by one O-ring 66 held in an annular seating 68 on the insert 60 and another O-ring 52 held in an annular seating 54 on the sub-block 50.

A duct 70 leads from each cavity 58 to the corresponding inlet connection 72 on the manifold block 17.

A port 74 connects the mounting cavity 58 to a piezoelectric transducer 76. A plunger 78 carries an O-ring 80 in a circumferential groove 82 which prevents test fluid passing from the cavity 58 to the transducer 76. The plunger 78 is urged, and possibly moved against the transducer 76 when the pressure in the cavity 58 increases as a result of test fluid being injected into the cavity by the injector 14.

It has been found that a very clear electrical signal is obtainable from the piezoelectric transducer if its piezogenerative crystal 77 is not clamped in position, that is to say it is retained loosely in the transducer.

Figure 3:
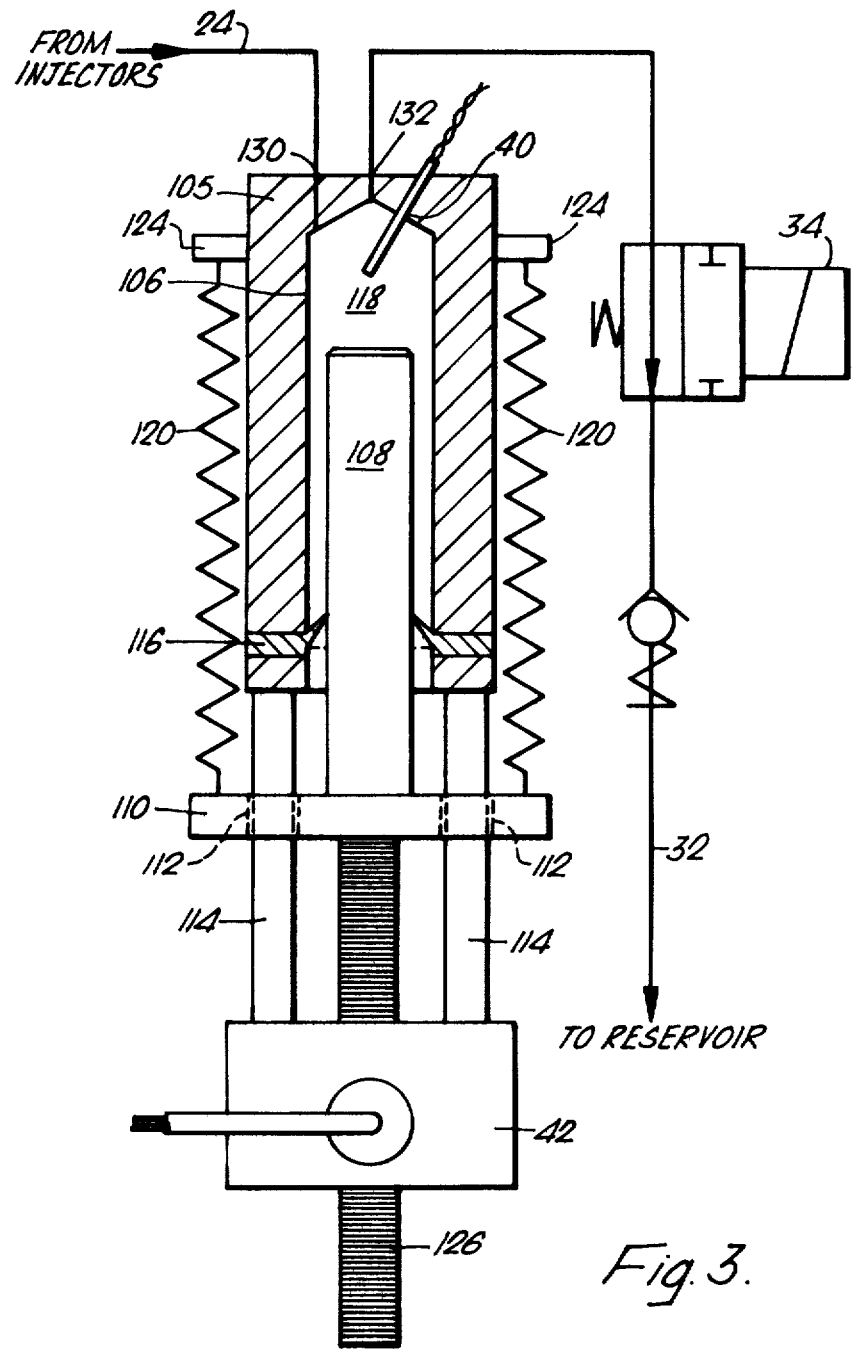
FIG. 3 shows fluid circuitry and an axial sectional diagrammatic view of a measuring device of the unit.

The measuring device 26 shown diagrammatically in FIG. 1 is shown in greater detail in FIG. 3 which shows its basic construction. It comprises a cylinder block 105 defining an internal cylinder 106 containing an accurately ground piston 108. One end of the piston 108 which projects from an open end of the cylinder 106 is fixed to a transverse bearing bar 110. The transverse bearing bar is formed with two through holes 112. Respective slide bars 114, which extend axially in relation to the piston and cylinder arrangement, extend through the holes 112 so as to constrain the bearing bar 110 to linear movement in an axial direction in relation to the piston and cylinder arrangement. A static PTFE (polytetrafluoroethylene) piston seal 116 is positioned at the open end of the cylinder 106 to form a seal around the piston 108 thereby to close a measuring chamber 118 defined between the piston 108 and the cylinder 106, and to aid in supporting the piston. Two low-rate piston-return tension springs 120 are each attached to the bearing bar 110 and to two respective spring hangers 124 to urge the piston 108 inwardly.

An optical grating bar 126 is fixed at one end to the centre of the bearing bar 110 and extends therefrom in the opposite direction to the piston 108 and in line therewith. This avoids possible shearing movement between the grating bar 126 and the piston 108 which might occur if the grating bar 126 were fixed to one side of the piston 108. The free end of the grating bar 126 extends underneath the optical reading head 42 of the measuring device.

The lines of the optical grating extend transversely of the axis of the piston and cylinder arrangement. Therefore, as the piston 108 is displaced linearly in relation to the cylinder 106, optical grating lines pass underneath the optical reading head 42 in succession. The optical grating lines are spaced apart by a distance of 20 microns. As the grating lines pass underneath a sensitive part of the optical reading head 42, the latter is caused to emit one pulse for every 1 micron of linear movement of the piston 108 by means of an interpolator.

The measuring device is connected to the fluid circuitry of the rest of the metering equipment by way of an inlet 130 to the measuring chamber 118, and an outlet 132 of the chamber 118. The inlet 130 is connected to the feed line 24, and the outlet 132 is connected to the drain line 32.

It will also be seen from FIG. 3 that the control valve 34, which is shown diagrammatically in that figure, is a solenoid valve which is energised to close the drain line 32 from the chamber 118.

The piston 108 is of a light-weight construction to reduce its inertia, so as to increase its response to the flow of incoming test fluid, and to reduce its tendency to oscillate longitudinally at the end of an injection.

The operation of the metering unit will now be described in detail.

With the fuel injection system on test operating to inject test fluid into the metering unit, the fluid from the eight injectors 14 flows into the respective cavities 58 in the injector mounting sub-block 50, then via the ducts 70 and 72 to the manifold block 17. Until such time as either one or both of the diverter valves 19 and 20 are switched to cause test fluid to flow into the feed line 24, the fluid then flows back through the drain line 25 to the reservoir 25a.

When all eight injectors are to be tested together both diverter valves 19 and 20, and isolator valves 21 and 22 are energised causing the test fluid from all lines to flow into the feed line 24 via the filter 28. The filter 28 removes any particles present in the test fluid before it flows on to the measuring device. The test fluid now flows into the measuring chamber 118 and passes out via the outlet 132, to be returned to the reservoir 25a via the drain line 32, the pressurising valve 36, and the control valve 34. The pressurising valve 36 ensures that any air or other gases or vapours are kept in solution in the measuring chamber 118.

When a metering procedure is to commence control valve 34 is energised to close the drain line 32, and cause the test fluid flowing continuously into the metering cavity 118 from a succession of individual injections to displace the piston 108 linearly against the force of the low-rate return springs 120. This displacement causes an electrical pulse to be emitted from the optical reading head interpolator for every one micron displacement of the piston 108 as already mentioned. Thus, each pulse corresponds to a particular volume of test fluid delivered by one of the injectors 14. In particular, if, for example, the cross-sectional area of the piston 108 is 100 mm$^2$, each pulse from the optical reading head interpolator corresponds to a volumetric output from the injector 14 of 0.1 mm$^3$.

During these operations, the piezoelectric transducer 76 of each of the eight detectors 12 is emitting pulses. One pulse from a piezoelectric transducer 76 occurs each time the associated injector injects fluid into the injector mounting block 10. In this way, each detector 12 acts as a point-of-injection detector of its associated injector 14. The electrical outputs from the eight point-of-injection detectors are shown on lines (a) to (h) of the time graph shown in FIG. 4. The displacement of the piston 108 of the measuring device 26 is represented by the line (p) shown in FIG. 4 extending over the same time period. Its movement is stepped, the steps being caused by the successive injections from the injectors 14 so that the line (p) showing piston displacement plotted against time is approximately a step function. Each pulse on lines (a) to (h) from a detector 12, representing the commencement of injection, is followed by a step in the line (p) representing the flow of fluid into the measuring chamber 118 caused by that injection. The fact that the function continually rises with each step is representative of the increasing displacement of the piston 108.

Figure 8:
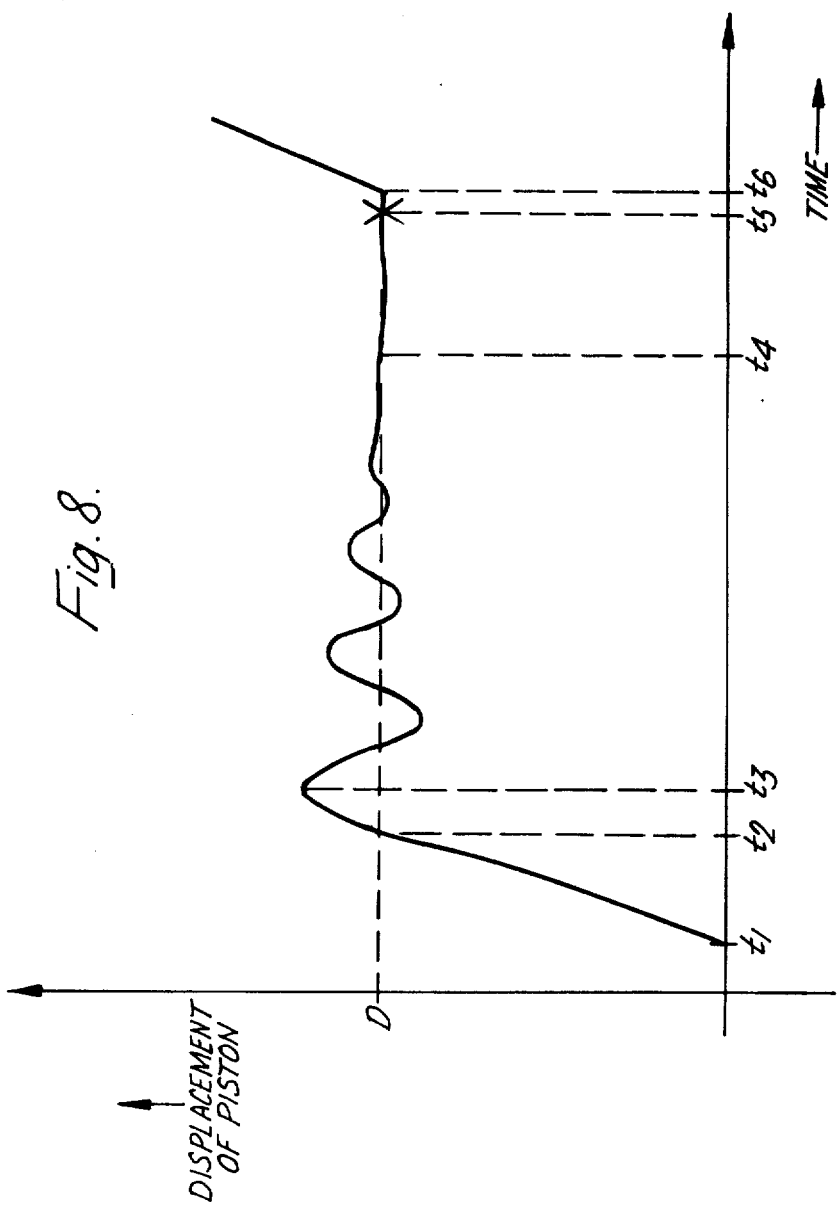
FIG. 8 shows a part of each graph shown in FIGS. 4 to 7 on a very much enlarged scale, piston displacement being magnified even more than time.

A more detailed representation of each step in the displacement of the piston 108 is shown in the graph of displacement plotted against time shown in FIG. 8. In this figure, the start of one of the step movements of the piston 108 following an injection from one of the injectors 14 is represented by the point $t_1$. At time $t_2$ the injection of test fluid from the injector 14 stops, but displacement of the piston continues, due to the inertia and elasticity of the total system. At time $t_3$, the restoring force exerted by the return springs 120 causes the piston to reverse direction of its linear motion. Linear oscillation of the piston continues in this way until time $t_4$ when it reaches equilibrium and comes to rest. The point of the next injection is at time $t_5$, and it will be seen that this occurs after $t_4$, when the transient oscillatory motion of the piston 108 has decayed. This shows the significance of detecting the point-of-injection of each injector, in that at least for low and medium speeds of the fuel pump shaft of the injection system, it occurs at an instant when the measuring device 26 is quiescent. It occurs just before the piston 108 starts to move again under the effect of the next injection at time $t_6$ because of the finite time taken for a shock wave in the test fluid to travel from the injector mounting block 10 to the measuring device 26.

Figure 4:
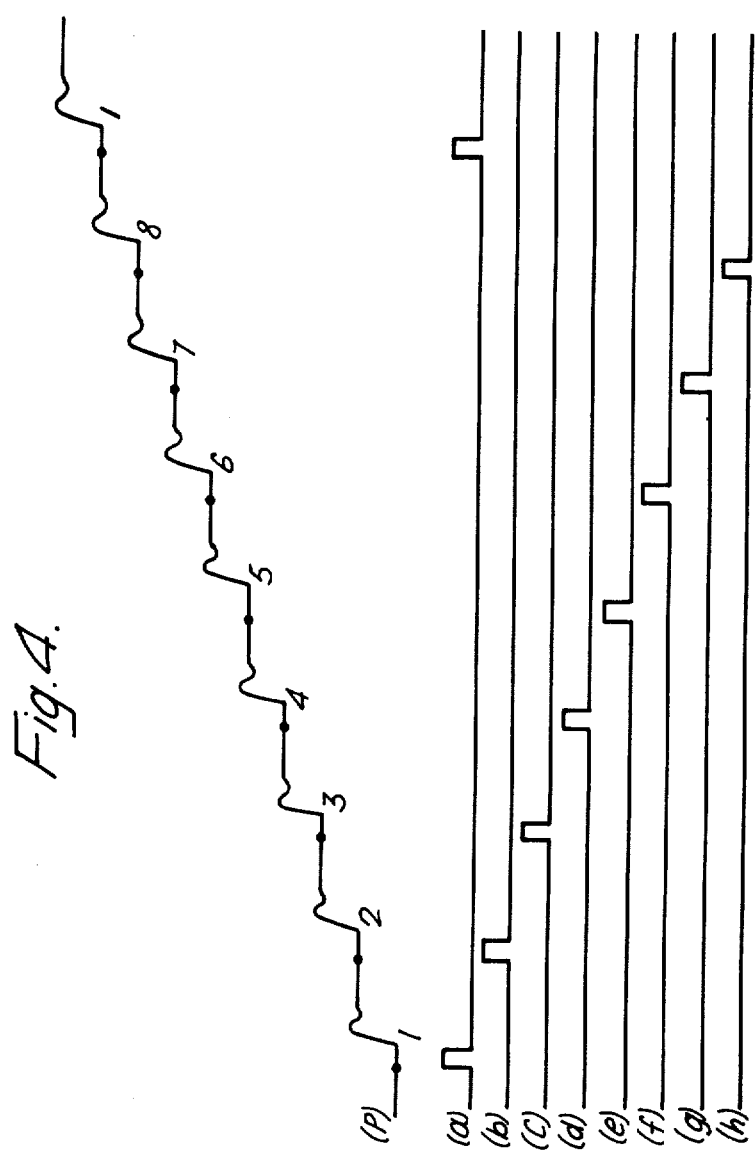
FIGS. 4 to 7 show graphs of piston displacement in the measuring device and output signals from point-of-injection detectors of the unit, plotted against time.
Figure 5:
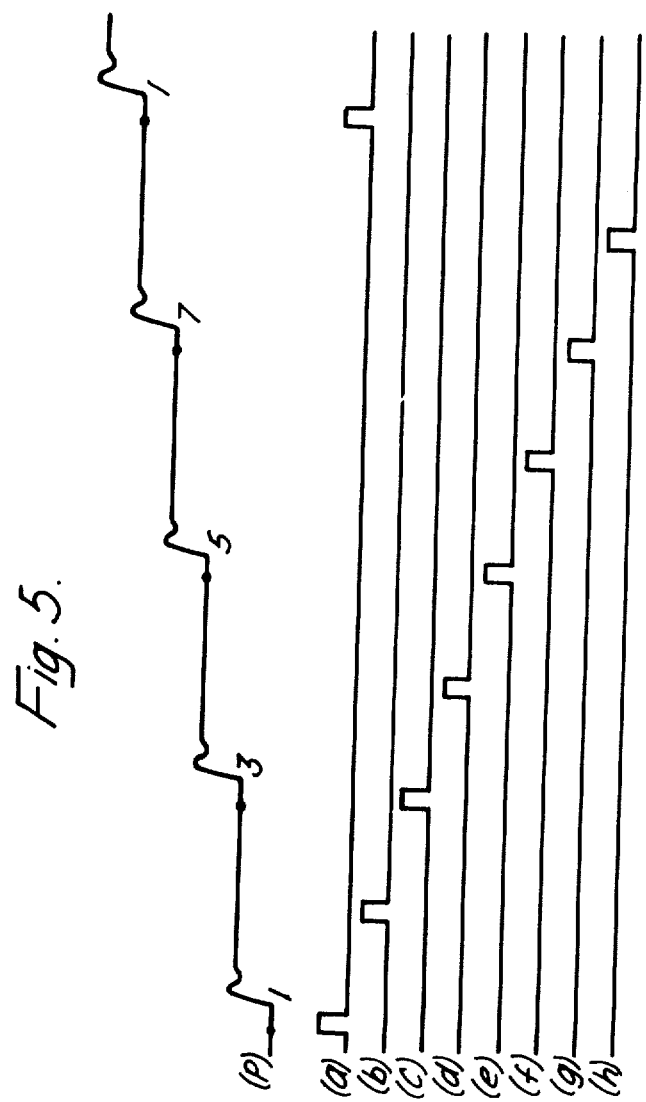
Figure 6:
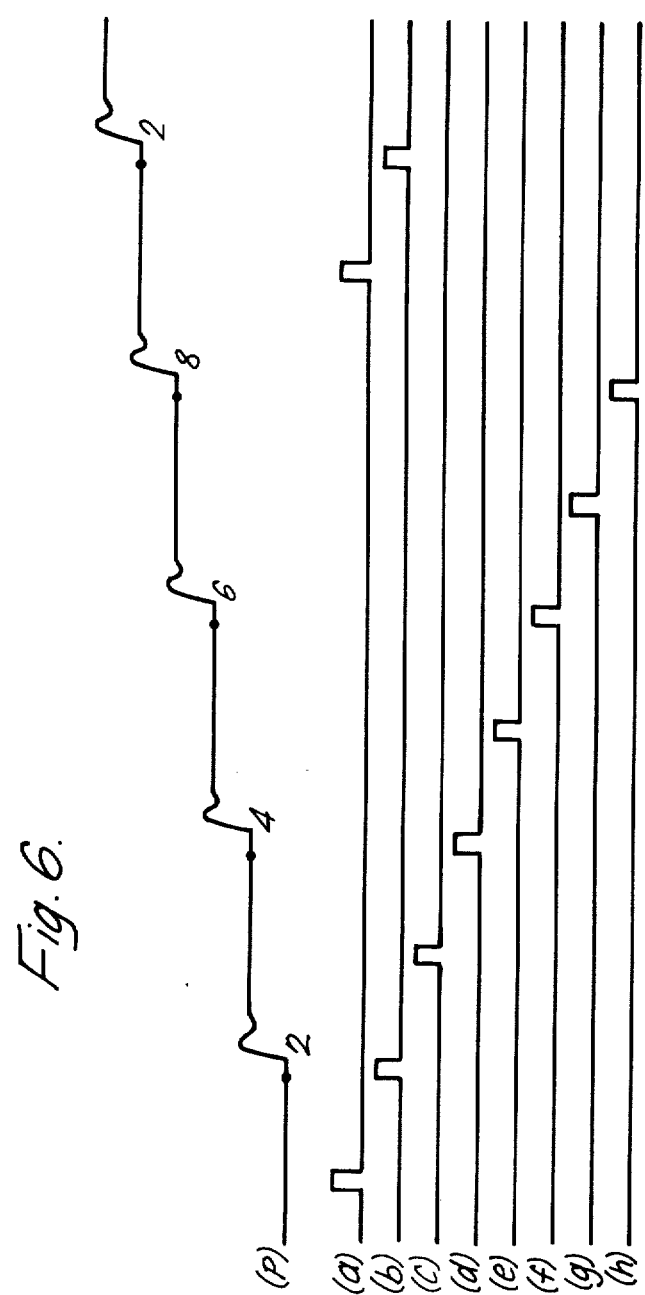

FIGS. 5 and 6 show graphs corresponding to FIG. 4, with only one of the diverter valves 19 and 20, respectively, open in relation to the feed line 24. Thus, FIG. 5 shows the piston displacement resulting from test fluid from only the odd numbered test injectors being passed to the measuring device 26, and FIG. 6 the piston displacement resulting from test fluid from only the even numbered injectors being passed to the measuring device 26. The purpose of such switching of the diverter valves 19 and 20, under certain conditions of operation will be described hereinafter.

Figure 7:
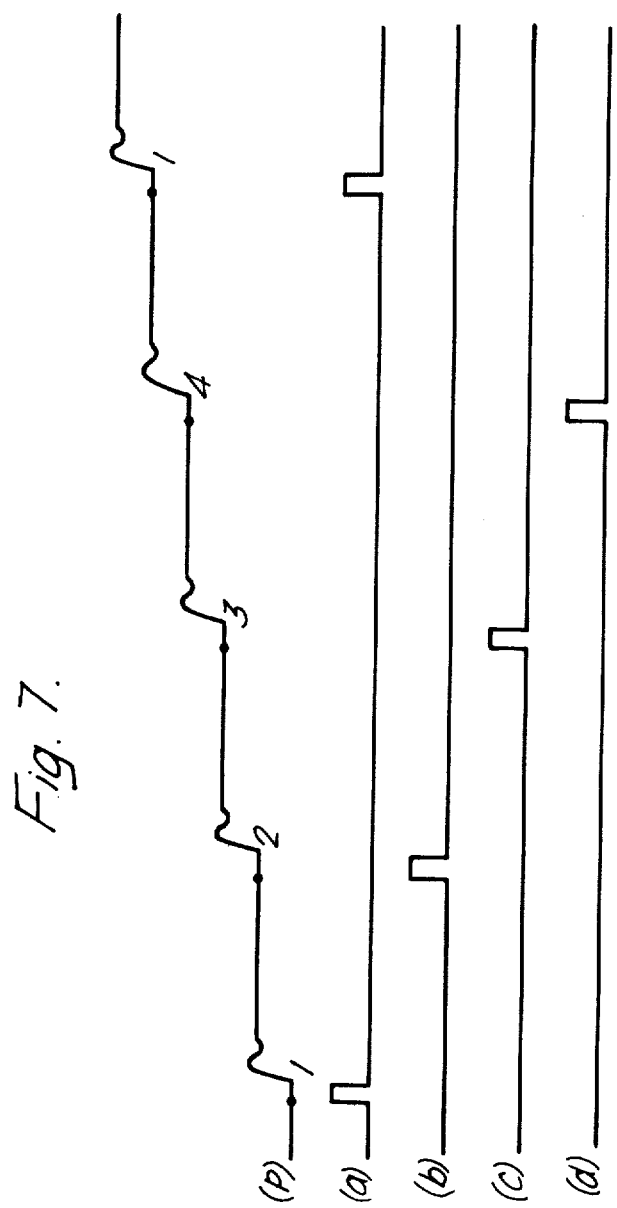

FIG. 7 shows a graph corresponding to FIG. 4 for a fourline fuel injection system.

Figure 9:
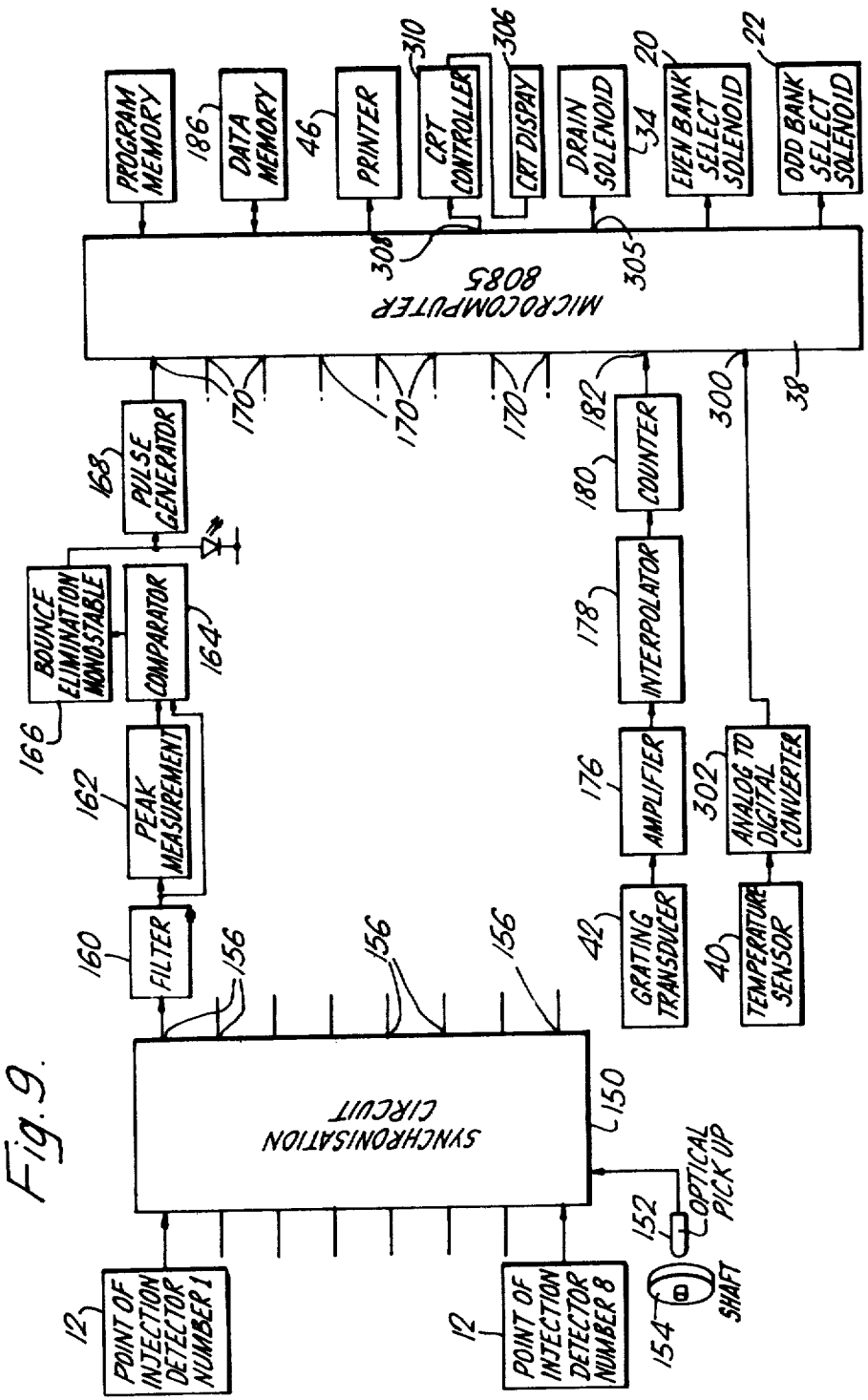
FIG. 9 shows a block circuit diagram of electrical circuitry of the unit.

The circuitry in which the electrical output signals from the various components of the metering unit are processed is indicated by FIG. 9.

A synchronisation circuit 150 receives signals from the eight point-of-injection detectors 12 and an optical pick up 152 which senses the rotation of a reflective patch attached to the drive shaft 154 of the injector pump. The synchronisation circuit 150 then generates eight additional signals which are synchronised to the rotation of the drive shaft 154 and are coincident with the point-of-injection detector signals. These two sets of signals are combined to form eight composite signals at respective synchronisation circuit outputs 156 which are fed to signal conditioners each comprising a filter 160, a peak measurement circuit 162, a comparator 164, a bounce elimination monostable 166, and a pulse generator 168. This ensures that the microcomputer 38 receives a suitable signal at each of its inputs 170 for each injection. Each conditioning circuit is provided with a photo-emitting diode 174 connected on one side to earth and on the other side to the conditioning line between the monostable multivibrator 166 and the pulse generator 168.

Each conditioning circuit operates as follows.

After the filter 160 has removed any high-frequency components from the incoming signal, its value is compared by the comparator 164 with a proportion of the peak value from the previous injection. If the signal is sufficiently close in value to the peak measurement at the time stored in the peak measurement circuit 162, the comparator 164 will allow the signal to pass on to the monostable multivibrator 166. This ensures that spurious signals do not give rise to a false point-of-injection pulse, whilst at the same time allowing for a variation in the magnitude of the output signal from the point-of-injection detector 12 with variation in the rate of injection. The bounce elimination monostable multivibrator 166 is switched to an on state for a sufficiently long period of time to ensure that bounce signals, whether created mechanically or electrically, are unlikely to occur when the multivibrator 166 switches back to its off state. A pulse signal generated by the pulse generator 168 on reception of the leading edge of the signal from the bounce elimination monostable multivibrator 166 will therefore correspond only to an actual point-of-injection, and not to any spurious signal resulting from mechanical, hydraulic or electrical bounce.

The light-emitting diode 174 gives a visual indication of when the multivibrator 166 is switched to an on state. This allows the operator to see readily whether the lines of the fuel injection system have been connected correctly.

Figure 10:
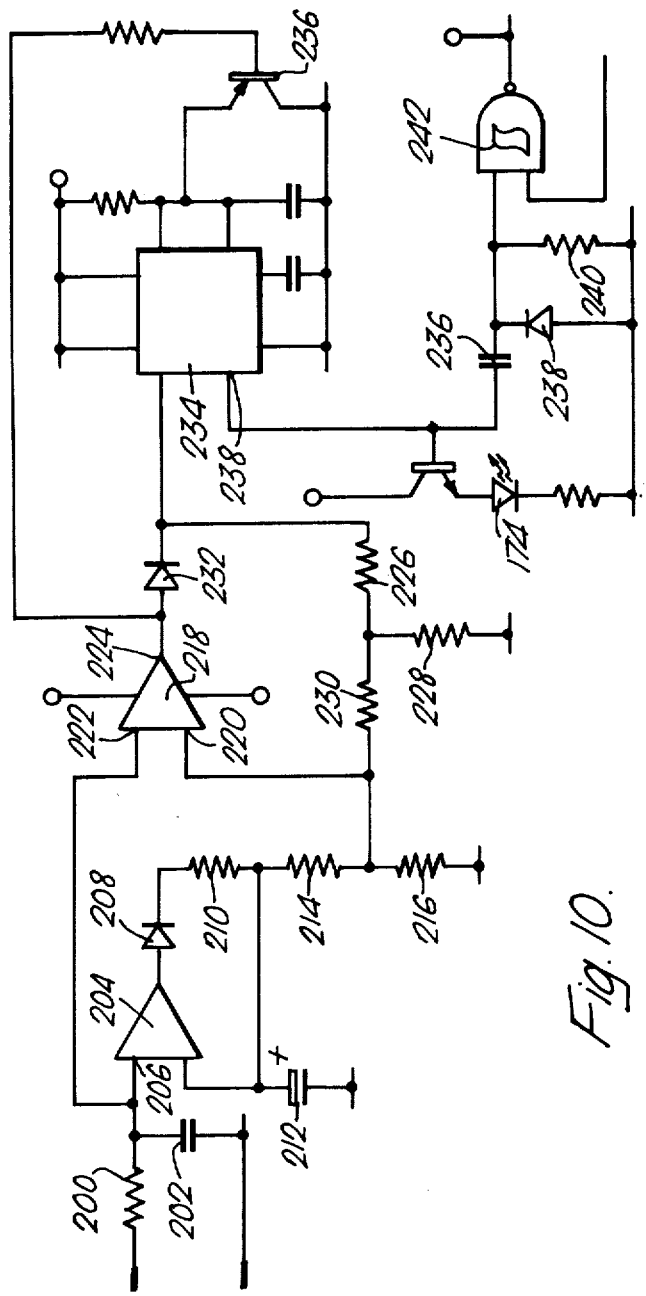
FIG. 10 shows a part of the electrical circuitry of FIG. 9 in greater detail.

One possible detailed structure of the point-of-injection signal conditioning circuit is shown in FIG. 10. Its structure and function will be described together for the sake of brevity. The signal from each point-of-injection detector 12 actually takes the form of a positive going spike followed by an oscillation at a lower amplitude which can last for a few milliseconds duration. The signal amplitude is a function of pump speed and delivery. For this reason, the threshold of the input circuitry is required to vary with the peak amplitude of the signal. As previously explained, there are eight identical conditioning circuits, one for each line, so one circuit only is illustrated in FIG. 10. A resistor 200 and capacitor 202 form a low pass filter to eliminate any high frequency noise from the signal. The signal is then fed to an integrated circuit 204 forming a peak measurement circuit in conjunction with a diode 208, a resistor 210, and a capacitor 212. When the input signal is greater than the voltage across the capacitor 212 then the current flows through the diode 208 and the resistor 210 to charge up the capacitor 212 until the voltage across it is equal to the input voltage.

At this point current stops flowing into the capacitor 212 because the diode 208 becomes reverse biased and the capacitor 212 stores a voltage equal to the peak input voltage. A slow discharge path is provided through resistors 214 and 216 which form an attenuator and provide an output signal at approximately two thirds of the peak amplitude. The values of the resistors 214 and 216 are chosen so that the discharge rate of the capacitor 212 is insignificant at the lowest operating speed.

The signal at the junction of the resistors 214 and 216 is used as one input 220 to the comparator formed by the integrated circuit 218 with inputs 220 and 222 and an output 224. The other input to the comparator is taken from the filtered signal from the point-of-injection detector 12, so the output 224 from the integrated circuit 218 switches low when the input signal exceeds two thirds of its peak value and returns to a high value when the input is below two thirds of the peak. In this way, any noise which is less than two thirds of the peak signal voltage is rejected by the circuit. A fast switching action of the circuit is accomplished by providing some positive feedback through the resistors 226, 228 and 230, and a diode 232.

The signal is then used to trigger a retriggerable monostable formed by an integrated circuit 234 and associated components. These are chosen to give a time period of approximately 8 milliseconds which is longer than the duration of a normal injection. If a second injection should occur within this time period the monostable will be retriggered by a transistor 236 and the time period will be extended by a further 8 milliseconds. This means that only one output pulse is generated from the circuit even when multiple injections may occur.

The output 238 from the circuit 234 is then taken to a differentiator circuit formed by a capacitor 236, and diode 238, a resistor 240 and an integrated circuit 242 which produces a negative going pulse of approximately 500 microseconds duration which is used as an input to the microcomputer 38 shown in FIG. 9. The timing of this pulse coincides with the peak signal from the point-of-injection detector 12 which occurs right at the start of injection. At this point, the piston 108 has not yet started to move because there is a finite time required for the shock wave to travel from the injector 14 to the measuring device 26, so that the maximum amount of time has been left for the piston to settle from the previous injection.

The manner in which the various components shown in FIG. 10 constitute the parts of the conditioning circuitry shown in block diagrammatic form in FIG. 9 are shown by the broken boxes in FIG. 10.

Referring back to the block circuit diagram shown in FIG. 9, the electrical output from the optical reading head 42 is fed, via an amplifier 176 and an interpolator 178, to a counter 180 which provides a signal at an input 182 to the microcomputer 38 indicative of the actual displacement of the piston 108 at any given instant. The microcomputer is programmed by the program memory 184 to feed the information provided at the displacement indicating input 182 to a data memory selectively according to the pulses it receives on its point-of-injection inputs 170. Thus, the movement of the piston given by the input 182 between input pulses received by the computer successively at the inputs 170 corresponding to, say, the second and third injectors, is attributed to the second injector. That movement is stored in that store of a 2K5 bytes random access memory 186 which is associated by the program memory 184 with the second injector. This allows for the fact that the displacement signal at the input 182 at the instant a point-of-injection signal is received at one of the inputs 170 is indicative of the position of the piston 108 after the immediately *preceding* injection.

In this way, the signals from the measuring device 26 relating to each of a succession of individual injections are determined, and the sizes or volumes of each injection and the identity of the injector responsible for that injection may be stored in the RAM 186, as may the total volume of test fluid injected by each injector over any given period of time or for any predetermined number of injections, by summing means within the computer 38. This allows for the fluid from the injectors of an eight-line system to be metered together.

One refinement incorporated in the illustrated metering unit is a means for correcting for changing temperatures of test fluid from the injectors, to take account of volumetric expansion and contraction of the test fluid with varying temperatures. Previously this was done by means of an intercooler in the feed line 24 arranged to bring the temperature of the test fluid to a nominal 40° C. before being passed to the measuring device. With the illustrated measuring unit this would give an undesirable increase in the length of the feed-line 24, resulting in increased time for transients to decay following an injection. Instead, the temperature sensor 40 is connected to the microcomputer 38 at an input 300 thereof via an analogue-to-digital converter 302, to provide the computer with a digital representation of the temperature of the test fluid inside the measuring chamber 118. The computer 38 is programmed to correct the volumetric values represented by the signals of the input 182 to give values that would be obtained if the test fluid in the measuring cavity 118 were at 40° C., for example. The mathematical formula stored in coded form in the program memory to direct the computer 38 to effect this correction is $$V_{T1} = V_{T2}[1 + \beta(T_2 - T_1)]$$

Where $T_1$ is the nominal test fluid temperature, in this case 40° C.;

$T_2$ is the actual test fluid temperature;

$\beta$ is the coefficient of volumetric expansion of the test fluid with temperature;

$V_{T2}$ is the measured volume at temperature $T_2$; and $V_{T1}$ is the computed volume corrected to temperature $T_1$.

In the event that the rotary speed of the injection system pump shaft exceeds a predetermined value, the interval between two successive injections will be less than the time between the instants $t_1$ and $t_4$ in FIG. 8, being the time for the piston 108 to become stationary after any particular injection. The information processed by the computer 38 would then be erroneous.

To prevent false measurements being made in this way, the computer 38 is programmed by the program memory 184 to detect when the rate of successive injection signals it receives exceed a predetermined value. At this stage, the computer 38 issues a signal first to the solenoid valves 19 and 21 for the odd-numbered lines and, when a metering procedure has been completed for those solenoid valves, to the even-numbered line solenoid valves 20 and 22. This results in the metering procedure described herein being executed first for the odd numbered injectors only, and then for the even numbered injectors, giving rise to the timing illustrated in FIGS. 5 and 6. As already mentioned, the injectors are numbered in this respect in pumpline delivery order. It will be seen from FIGS. 5 and 6 that, when a signal is delivered by the computer 32 for example for the even numbered injectors, the piston 108 only moves in steps according to signals issued from the point-of-injection detectors 12 corresponding to the odd numbered detectors, represented in lines (a), (c), (e) and (g) of FIG. 5. Similarly for the even numbered injectors as shown in FIG. 6, where the effective signals occur in lines (b), (d), (f) and (h).

Every time the computer 38 recognises that the piston 108 has reached its maximum displacement, it issues a signal from its output 305 to the drain solenoid valve 34.

The information thus stored in the computer 38, in accordance with the program stored in the program memory 184, is displayed on the print-out 46 and a cathode-ray-tube display (CRT display) 306. The latter is connected to a display control output 308 of the computer 38 via a video CRT controller 310.

The actual layout of the possible display on the CRT display 306 is shown in FIG. 11. Above the actual cathode ray tube 44 are arranged the light-emitting diodes 174 for easy observation by the operator. In this particular display, the accumulated measured volume of test fluid delivered by each injector is illustrated as a block graph in the form of respective blocks 314, one in relation to each injector. A further, thinner block 316 represents the average accumulated value for all the injectors. Above the block graph is further information measured by the various components already described, the signals from which are processed by the computer to be displayed on the screen as illustrated in FIG. 11.

Although a measuring device has been described which issues an electrical pulse for every micron travel of the piston, and this is the preferred construction, it will be appreciated by those skilled in the art that the measuring device could include a displacement transducer that provides an analogue signal, in which case the equipment would be adapted so that means are provided for determining which of the values of the analogue signal relate to each of a succession of individual injections.

We claim:
1. Volumetric metering equipment comprising:
   (a) mounting means by which an injector of a fuel injection system can be mounted on said equipment;
   (b) a measuring device which is constructed to receive test fluid and to provide a signal indicative of the volume of test fluid received by said device;
   (c) at least one passageway extending from said mounting means to said measuring device to allow test fluid to pass from such an injector to said measuring device when said equipment is in use;
   (d) wall means of said measuring device defining a chamber into which opens said at least one passageway, the chamber being capable of containing a volume of test fluid which is the sum of the volumes of many injections through such an injector;
   (e) transducer means of the measuring device attached to said wall means to provide an electrical signal which is indicative of the amount of test fluid at each and every stage of that amount increasing to said volume;
   (f) detection means arranged to detect a given point in an injection cycle of such a fuel injection system as said amount increases to said volume; and
   (g) individual injection volume determining means connected to said detection means and to said transducer means to record the values of said electrical signal at the successive instants corresponding to said given point as said amount increases to said volume, and from these values to determine the volumes of each of a succession of individual injections through such an injector.

2. Equipment according to claim 1, in which said chamber is of a variable volume which is gradually increased during successive injections from an injector when said equipment is in use.

3. Equipment according to claim 2, in which said measuring device comprises positive piston displacement means.

4. Equipment according to claim 2, in which said measuring device comprises a displacement/electrical transducer.

5. Equipment according to claim 1, in which said detection means are arranged to detect a point in an injection cycle when transients in said metering device have decayed.

6. Equipment according to claim 5, in which said point is the commencement point of an injection.

7. Equipment according to claim 5, in which said detection means comprise a cavity which receives the nozzle end of an injector, and a pressure sensor in communication with said cavity, arranged to detect when fluid is shot out through the nozzle of the injector.

8. Equipment according to claim 7, in which said pressure sensor comprises a piezoelectric transducer.

9. Equipment according to claim 8, in which said piezoelectric transducer comprises a piezoelectric crystal which is retained loosely in said transducer.

10. Equipment according to claim 1, further comprising connection means to connect said measuring device to receive test fluid from more than one injector of a multi-line fuel injection system which is on test, whereby said measuring device is open to those injectors at the same time.

11. Equipment according to claim 10, in which said detection means comprise a plurality of detectors arranged to detect which injector is responsible for each successive injection.

12. Equipment according to claim 11, in which said individual injection volume determining means are provided with recording means to provide a record of the respective volumes of test fluid, ejected during a test from the individual injectors, the metering procedure for more than one injector thus being performed over the same period.

13. Equipment according to claim 1, further comprising a computer connected to process said signals from said measuring device.

14. Equipment according to claim 1, further comprising a temperature sensitive device arranged to measure the temperature of the test fluid in said measuring device, and means connected to said temperature sensitive device to perform corrections on volume readings made by said equipment, to account for volumetric changes of the test fluid which occur as a result of changes in temperature.

15. Volumetric metering equipment comprising:
   (a) mounting means by which an injector of a fuel injection system can be mounted on said equipment;
   (b) a positive piston displacement measuring device defining a chamber the volume of which increases with increasing displacement of said piston up to a volume which is the sum of the volumes of many injections through such an injector;
   (c) at least one passageway extending from said mounting means to said measuring device where it opens into said chamber to allow test fluid to pass from such an injector to said chamber when said equipment is in use;
   (d) a displacement/electrical transducer connected to said piston to provide an electrical signal which is indicative of the amount of test fluid for the time being contained in said chamber at each and every stage of that amount increasing to said volume;
(e) detection means arranged to detect a given point in an injection cycle of such a fuel injection system when transients in said metering device have decayed, as said amount increases to said volume; and
(f) individual injection volume determining means connected to said detection means and to said displacement/electrical transducer to record the values of said electrical signal at the successive instants corresponding to said given point, as said amount increases to said volume, and from these values to determine the volumes of each of a succession of individual injections through such an injector.

* * * * *